US009472815B2

(12) United States Patent
Lee et al.

(10) Patent No.: US 9,472,815 B2
(45) Date of Patent: Oct. 18, 2016

(54) SEPARATOR FOR FUEL CELL AND METHOD FOR MANUFACTURING THE SAME

(71) Applicants: Hyundai Motor Company, Seoul (KR); Korea University Research and Business Foundation, Seoul (KR)

(72) Inventors: Chi Seung Lee, Yongin-si (KR); Seong Il Heo, Yongin-si (KR); Suk Min Baeck, Yongin-si (KR); Jun Ho Jang, Yongin-si (KR); Sang Mun Jin, Yongin-si (KR); Yoo Chang Yang, Yongin-si (KR); Kyung Min Kim, Seoul (KR); Yang Bok Lee, Seoul (KR); Dae Soon Lim, Seoul (KR)

(73) Assignees: HYUNDAI MOTOR COMPANY, Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 323 days.

(21) Appl. No.: 14/040,274

(22) Filed: Sep. 27, 2013

(65) Prior Publication Data

US 2014/0295324 A1    Oct. 2, 2014

(30) Foreign Application Priority Data

Mar. 29, 2013    (KR) .................. 10-2013-0034500

(51) Int. Cl.
*H01M 8/0206* (2016.01)
*H01M 8/0228* (2016.01)
(Continued)

(52) U.S. Cl.
CPC ......... *H01M 8/0206* (2013.01); *H01M 8/0221* (2013.01); *H01M 8/0228* (2013.01); *Y02E 60/50* (2013.01); *Y02P 70/56* (2015.11); *Y10T 156/10* (2015.01)

(58) Field of Classification Search
CPC .................................................. H01M 8/0239
See application file for complete search history.

(56) References Cited

U.S. PATENT DOCUMENTS

2005/0031933 A1* 2/2005 Blunk ................. H01M 8/0206
429/437
2008/0113253 A1* 5/2008 Yagi .................... H01M 8/0206
429/450

(Continued)

FOREIGN PATENT DOCUMENTS

JP    2005-200620 A    7/2005
JP    2005-209641 A    8/2005

(Continued)

*Primary Examiner* — Barbara Gilliam
*Assistant Examiner* — Nathanael Zemui
(74) *Attorney, Agent, or Firm* — McDermott Will & Emery LLP

(57) ABSTRACT

A separator for a fuel cell and a method for manufacturing the same comprise two sheets of metal plates integrally formed to minimize contact resistance between an upper metal plate and a lower metal plate. The method for manufacturing the separator includes steps of preparing an upper metal plate and a lower metal plate, each plate having opposing main sides, and applying a coating liquid containing a polymer composite material on both sides of the upper and lower metal plates, to form first and second composite material layers on both sides of the upper plates and third and fourth composite material layers on both sides of the lower plates. The method further includes stacking the upper metal plate on the lower metal plate, before drying the respective composite material layers, and integrally bonding the second composite material layer and the third composite material layer to form a single intermediate composite material layer.

7 Claims, 6 Drawing Sheets

(51) Int. Cl.
*H01M 8/0221* (2016.01)
*H01M 8/02* (2016.01)

(56) References Cited

U.S. PATENT DOCUMENTS

2009/0011318 A1\* 1/2009 Sasaki .................... B82Y 30/00
429/514
2009/0191351 A1 7/2009 Owejan et al.

FOREIGN PATENT DOCUMENTS

| JP | 2006-012518 A | 1/2006 |
| KR | 10-0839193 B1 | 6/2008 |
| KR | 10-2009-0123661 A | 12/2009 |
| KR | 10-2010-0094907 A | 8/2010 |
| KR | 10-2010-0109253 A | 10/2010 |
| KR | 10-2012-0001266 A | 1/2012 |

\* cited by examiner

SEPARATOR FOR FUEL CELL AND METHOD FOR MANUFACTURING THE SAME

CROSS-REFERENCE TO RELATED APPLICATION

This application claims under 35 U.S.C. §119(a) priority to and the benefit of Korean Patent Application No. 10-2013-0034500 filed Mar. 29, 2013, the entire contents of which are incorporated herein by reference.

TECHNICAL FIELD

The present disclosure relates to a separator for a fuel cell and a method for manufacturing the same, and more particularly, the separator for a fuel cell and a method for manufacturing the same, which comprises two sheets of metal plates, and minimizes contact resistance between an upper metal plate and a lower metal plate.

BACKGROUND

In general, a fuel cell converts chemical energy into electrical energy through a redox reaction of hydrogen and oxygen. A unit cell of the fuel cell has a low output voltage. Thus, several to hundreds of unit cells are generally stacked into a fuel cell stack. A separator provides an electrical connection between the unit cells during stacking the unit cells and acts as flow fields by which reactant gases are separated and through which coolant flows.

For a typical separator, the volume and weight of the fuel cell stack can be reduced by reducing the thickness during a manufacturing process, such as stamping, etc., which allows for mass production.

A metal separator has advantages, such as high electrical conductivity and excellent mechanical properties and processability. However, the typical metal separator can be easily corroded in a hot and humid environment of the fuel cell.

Conventionally, a technique of coating a polymer composite material comprising a conductive additive on the surface of the separator has been developed to solve the problem.

The separator for a polymer electrolyte fuel cell provides a passage through which coolant passes to remove heat generated during the operation.

As shown in FIG. 8, the conventional separator comprises two sheets of metal plates 1 and 2, as base materials for the passage through which coolant passes. Contact resistance is generated on a surface between the two metal plates.

A polymer composite material coated on the two metal plates creates a contact surface between a composite material coating layer 3 and a composite material coating layer 4 as well as between each composite material coating layer and the metal plate generating high contact resistance, thus reducing the efficiency of the fuel cell.

The above information disclosed in this Background section is only for enhancement of understanding of the background of the disclosure and therefore may contain information that does not form the prior art that is already known in this country to a person of ordinary skill in the art.

SUMMARY OF THE DISCLOSURE

The present disclosure provides a separator for a fuel cell and a method for manufacturing the same, in which carbon nanotubes are grown on both sides of an upper metal plate and a lower metal plate, respectively. Composite material layers are formed by coating a polymer composite material thereon, and the composite material layers between the upper and lower metal plates are integrally bonded before the polymer composite material is dried, thus minimizing contact resistance between the two metal plates.

According to one aspect of the present disclosure, a separator for a fuel cell comprises an upper metal plate having opposing main sides including first and second composite material layers coated on both sides thereof, and a lower metal plate having opposing main sides stacked on the bottom of the upper metal plate, including third and fourth composite material layers coated on both sides thereof. Wherein the second and third composite material layers are integrally bonded, before being solidified, to form a single intermediate composite material layer.

According to another aspect of the present disclosure, a method for manufacturing a separator for a fuel cell comprises preparing an upper metal plate having opposing main sides are formed and a lower metal plate having opposing main sides. First and second composite material layers are formed on both sides of the upper plates, and third and fourth composite material layers are formed on both sides of the lower plates by applying coating liquid containing a polymer composite material on both sides of the upper and lower metal plates, respectively. A single intermediate composite material layer is formed by stacking the upper metal plate on the lower metal plate, before drying the respective composite material layers, and integrally bonding the second composite material layer and the third composite material layer.

The method may further comprise a step of, before forming the composite material layers on both sides of the upper metal plate and the lower metal plate, growing carbon nanotubes on both sides of the upper metal plate and the lower metal plate, respectively.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative.

Figure 1:
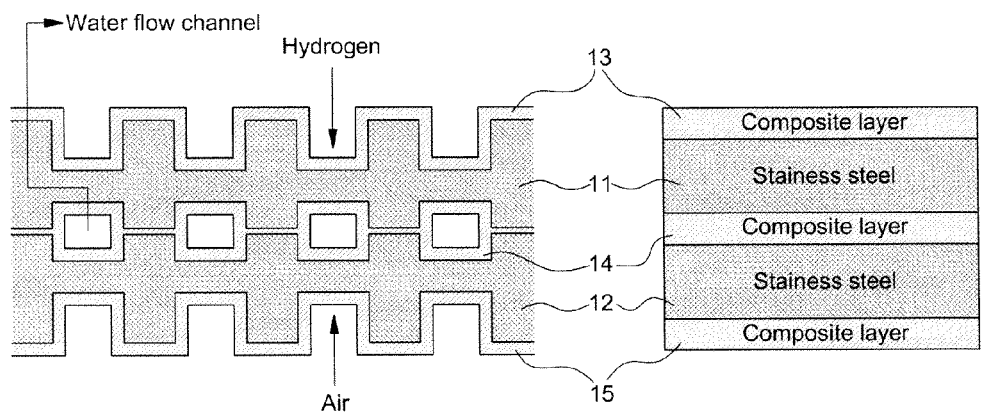
FIG. 1 is a schematic view showing a cross-sectional structure of a separator for a fuel cell according to the present disclosure.

It should be understood that the appended drawings are not necessarily to scale, presenting a somewhat simplified representation of various preferred features illustrative of the basic principles of the disclosure. The specific design features of the present disclosure herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the inventive concept will be described in conjunction with exemplary embodiments, it will be understood the present description is not intended to limit the invention to those exemplary embodiments. On the contrary, the inventive concept is intended to cover not only the exemplary embodiments, but also various alternatives, modifications, equivalents and other embodiments, which may be included within the spirit and scope of the invention as defined by the appended claims.

As shown in FIG. 1, a separator for a fuel cell comprises an upper metal plate 11 and a lower metal plate 12. An upper composite material layer 13 is disposed on the upper side of the upper metal plate 11, a lower composite material layer 15 is disposed on the lower side of the lower metal plate 12, and an intermediate composite material layer 14 is disposed between the upper metal plate 11 and the lower metal plate 12.

Figure 4:
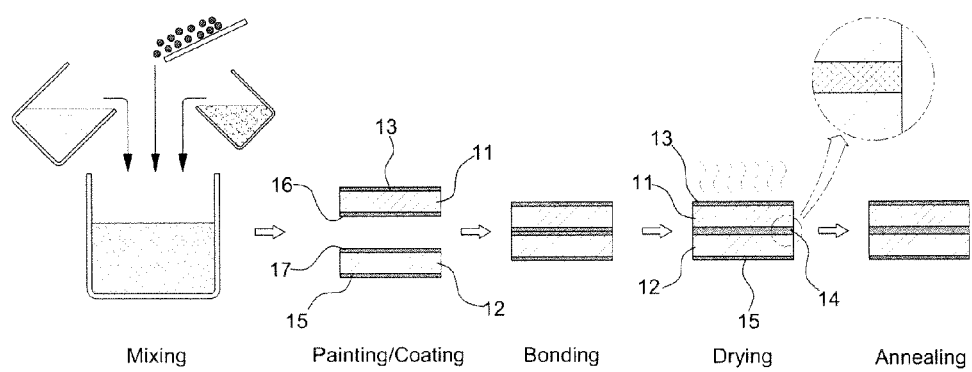

Referring to FIG. 4, the first composite material layer 13 and a second composite material layer 16 are respectively coated on both sides of the upper metal plate 11 where carbon nanotubes are grown.

A third composite material layer 17 and a fourth composite material layer 15 are respectively coated on both sides of the lower metal plate 12 where the carbon nanotubes are also grown.

The composite material layers 13, 15, 16, and 17 are formed by coating liquid comprising a polymer matrix and conductive filler where the upper metal plate 11 is stacked on the lower metal plate 12 before applying drying process for the separator.

That is, a coating liquid containing a polymer composite material is applied on the surfaces of the upper and lower metal plates 11 and 12, and then the upper metal plate 11 is stacked on the lower metal plate 12 before drying.

The second composite material layer 16 is disposed on the lower side of the upper metal plate 11 and the third composite material layer 17 disposed on the upper side of the lower metal plate 12. Before the composite material layers are solidified, they are integrally bonded into a single composite material layer, thus, forming a single intermediate composite material layer 14 between the two metal plates.

Figure 2:
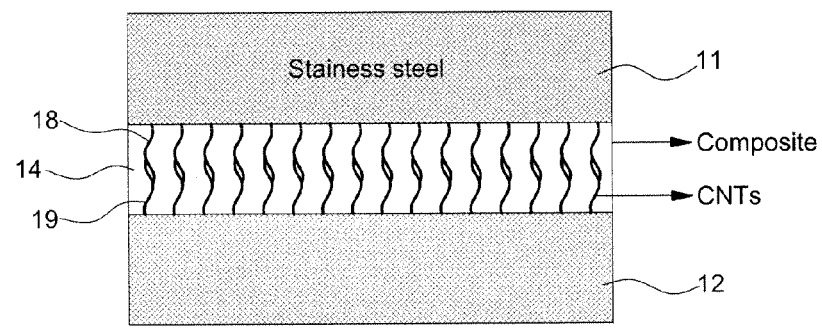
FIG. 2 is a partially enlarged view showing a separator for a fuel cell according to the present disclosure.

Referring to FIG. 2, carbon nanotubes 18 and 19 grown on the lower side of the upper metal plate 11 and the upper side of the lower metal plate 12, respectively, are connected to each other in the intermediate composite material layer 14. Each of the nanotube grown on the upper and lower metal plates 11 and 12 has a height of 5 to 10 μm, and the composite material layers 13, 15, 16, and 17 coated on the upper and lower metal plates 11 and 12 have heights of 10 to 20 μm.

Accordingly, the thickness of the upper and lower composite material layers 13 and 15 is 10 to 20 μm each, and the thickness of the intermediate composite material layer 14 is 20 to 40 μm.

If the carbon nanotube has a height less than 5 μm, a reduction in electrical conductivity occurs. On the other handle if the height of the carbon nanotube is greater than 10 μm, undesirable defects occur on the coating surface.

Moreover, for the composite material layers 13, 15, 16, and 17 having a thickness less than 10 μm, the composite material layers are separated during a fuel cell stack assembly, and for greater than 20 μm, an undesirable overall resistance is increased.

According to the separator for the fuel cell described above, a single intermediate composite material layer 14 is disposed between the upper metal plate 11 and the lower metal plate 12, thereby removing the contact surface between the upper and lower metal plates 11 and 12, and making it possible to eliminate the contact resistance between the two metal plates. Moreover, the carbon nanotubes 18 and 19 grown on the upper and lower metal plates 11 and 12 are directly connected to each other, and thus reduce the contact resistance between the upper and lower metal plates 11 and 12 and the intermediate composite material layer 14 and minimize the contact resistance generated between the two metal plates.

Figure 3:
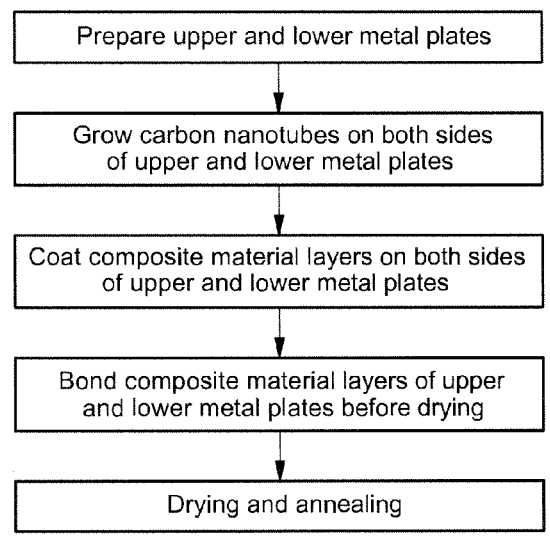
FIGS. 3 and 4 are schematic flowcharts showing a method for manufacturing a fuel cell according to the present disclosure.

A method for manufacturing a separator for a fuel cell is schematically shown in FIGS. 3 and 4.

As shown in FIG. 3, a method for preparing a separator for a fuel cell comprises the steps of: preparing an upper metal plate 11 having opposing main sides and a lower metal plate 12 having opposing main sides; growing nanotubes on both sides of the upper metal plate 11 and the lower metal plate 12, respectively; forming composite material layers 13, 15, 16, and 17 by applying a coating liquid containing a polymer composite material on both sides of the upper metal plate and the lower metal plate 11 and 12, respectively, where the carbon nanotubes are grown; and integrally bonding a second composite material layer 16 of the upper metal plate 11 and a third composite material layer 17 of the lower metal plate 12 by stacking the upper metal plate 11 on the lower metal plate 12, and then, subjecting the separator to drying and annealing processes.

For the process of growing carbon nanotubes on the surfaces of the upper and lower metal plates 11 and 12, a well-known technique is employed.

The first, second, third, and fourth composite material layers 13, 15, 16, and 17 are formed by applying a polymer composite material on both sides of the upper and lower metal plates 11 and 12, respectively. The coating liquid applied on both sides of the upper metal plate 11 forms the first and second composite material layers 13 and 16, and the coating liquid applied on both sides of the lower metal plate 12 forms the third and fourth composite material layers 17 and 15.

Referring to FIG. 4, after the composite material layers 13, 15, 16, and 17 are formed on both sides of the upper and lower metal plates 11 and 12, the lower metal plate 12 is stacked on the lower side of the upper metal plate 11 before the composite material layers 13, 15, 16, and 17 are dried.

The second composite material layer 16 and the third composite material layer 17, which are not dried, are bonded integrally to form the single intermediate composite material layer 14 between the upper metal plate 11 and the lower metal plate 12, thus eliminating the contact surface between the upper metal plate 11 and the lower metal plate 12.

After the intermediate composite material layer 14 is formed between the upper metal plate 11 and the lower metal plate 12, drying and annealing processes are performed to complete the manufacturing process.

Here, the polymer composite material contained in the coating liquid comprises a polymer matrix and a conductive filler. A conductive polymer used for the conductive filler provides adhesion between the upper and lower metal plates 11 and 12 and the respective composite material layers 13, 15, 16, and 17.

Polyamide-imide (PAI), a thermoplastic polymer having excellent adhesion with the metal plates as the base materials and the carbon nanotubes with excellent moldability, is preferable as the conductive filler.

The PAI is an aromatic polymer having an amide group and an imide group as repeating units in the polymer chain and is used when excellent coating stability and processability are required.

During manufacturing the separator, the PAI exhibits strong interaction and electron transfer with metal in the annealing process, thus generating strong adhesion for metal, compared to that of other polymers.

Figure 5:
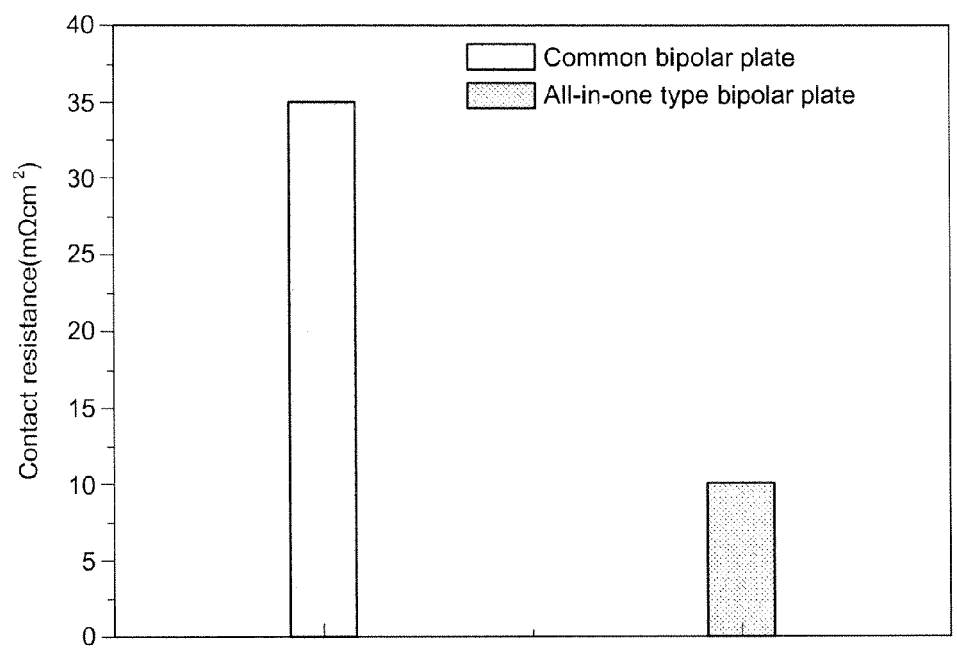
FIG. 5 shows a comparison graph of contact resistance between an upper metal plate and a lower metal plate with respect to a separator according to the present disclosure and a separator according to the prior art.

FIG. 5 shows a comparison of contact resistance between an upper metal plate and a lower metal plate with respect to a separator according to the present disclosure and a separator according to the prior art.

The separator according to the prior art is manufactured by bonding an upper metal plate and a lower metal plate, in which both main sides coated with a composite material layer, thereby forming a contact surface inbetween.

As shown in FIG. 5, the contact resistance of the separator according to the present disclosure is significantly reduced compared to that of the separator according to the prior art.

The method for manufacturing the separator according to the present disclosure will be described in more detail.

Two sheets of austenite-based stainless steel (SUS304) substrates are prepared, and then each side of the substrates are polished with sandpaper and washed with acetone.

Each substrate is then acid-treated with 5 wt % HF solution for 10 minutes and etched to expose metal catalysts, such as Fe, Cr, etc., on the surface of the substrates.

The resulting substrates are placed in a heating furnace at 750° C. under a nitrogen atmosphere, in which hydrogen gas and acetylene gas are introduced at a flow rate of 100 sccm and 40 sccm, respectively, to grow carbon nanotubes (CNTs) from the metal catalysts exposed on the surface of the substrate for 1 to 10 minutes. At this time, the growth length of CNTs can be controlled by controlling the amount of acetylene introduced into the heating furnace.

Subsequently, a coating liquid is prepared by adding a polymer composite material comprising carbon black and PAI powder to an N-methylpyrrolidone (NMP) solvent, and then the coating liquid is applied on the surface of the substrate, on which the carbon nanotubes are grown, by painting.

Two sheets of substrates are stacked before the coating liquid is dried, such that a coating layer of an upper substrate and lower substrate are integrally bonded, thus forming a single coating layer between the two substrates. At this time, the carbon nanotubes grown on the upper substrate and the lower substrate are in a direct contact with each other.

Next, the resulting substrate having the coating layer is dried at room temperature for 24 hours, followed by annealing at 150° C. for 2 hours.

The PAI contained in the coating liquid is a conductive filler and acts as a binder that allows carbon black to be well bonded to the surface of the substrate.

In addition to the PAI contained in the coating liquid, a conductive polymer, dissolved in a solvent, may be used as the conductive filler, and a carbon-based material, which can be added to the solvent, may be selected as the polymer matrix. The materials for the conductive filler and the polymer matrix can improve the performance of the separator.

In order to compare the contact resistances of the separators by the type of conductive filler contained in the composite material layer, polyvinylester (PVE) was used as a conductive filler of the composite material layer to prepare first and second separator samples, polyamide-imide (PAI) for third and fourth separator samples, and polypropylene (PP) for fifth and sixth separator samples.

30 wt % carbon black was used as a polymer matrix of the composite material layer to prepare the first, third, and fifth separator samples, and 35 wt % carbon black for the second, fourth, and sixth separator samples. The separator samples were prepared under the same conditions, except for the carbon black contents.

Figure 6:
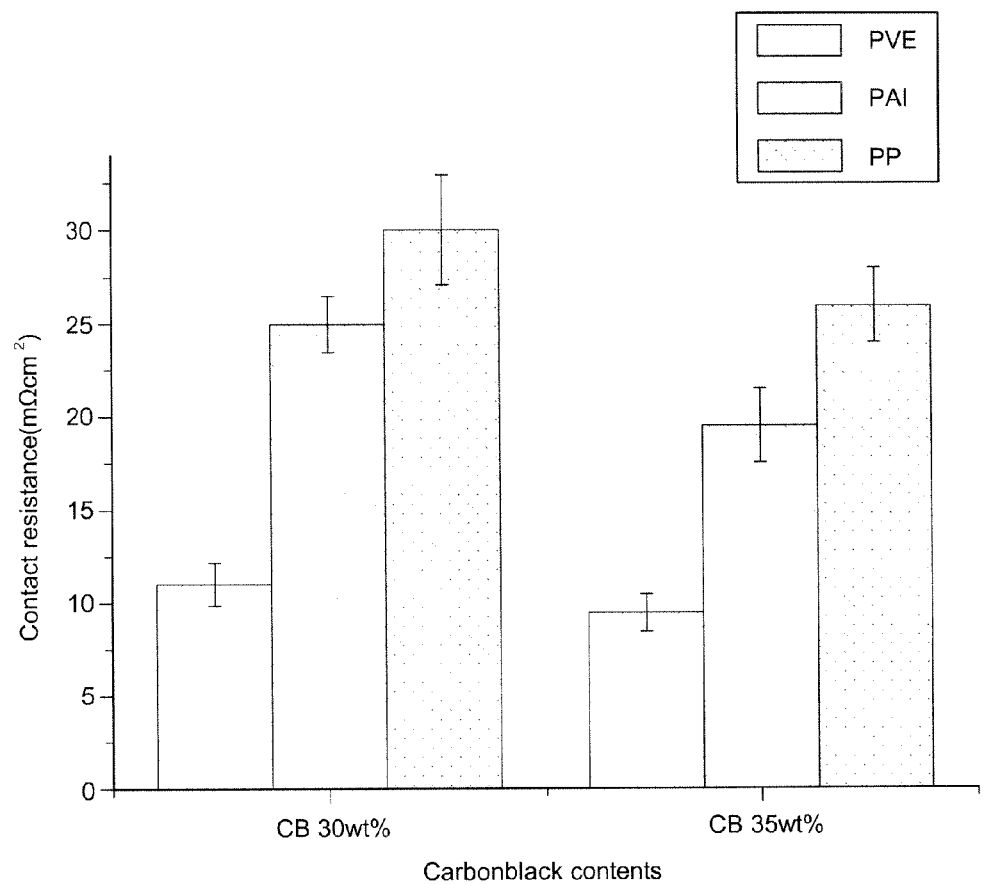
FIG. 6 shows the measurement results of contact resistance generated between an upper metal plate and a lower metal plate with respect to various separator samples.

FIG. 6 shows the results of the contact resistance generated between the upper metal plate and the lower metal plate with respect to the separator samples prepared in the above manner was measured.

The first, third, and fifth separator samples showed contact resistance values of 12, 25, and 30 mΩcm$^2$, respectively, and the second, fourth, and sixth separator samples showed contact resistance values of 10, 21, and 26 mΩcm$^2$, respectively.

That is, when the PVE and PAI were used, the contact resistance values of the separators were relatively lower than that of the PP, with the lowest contact resistance value being when PVE was used.

Figure 7:
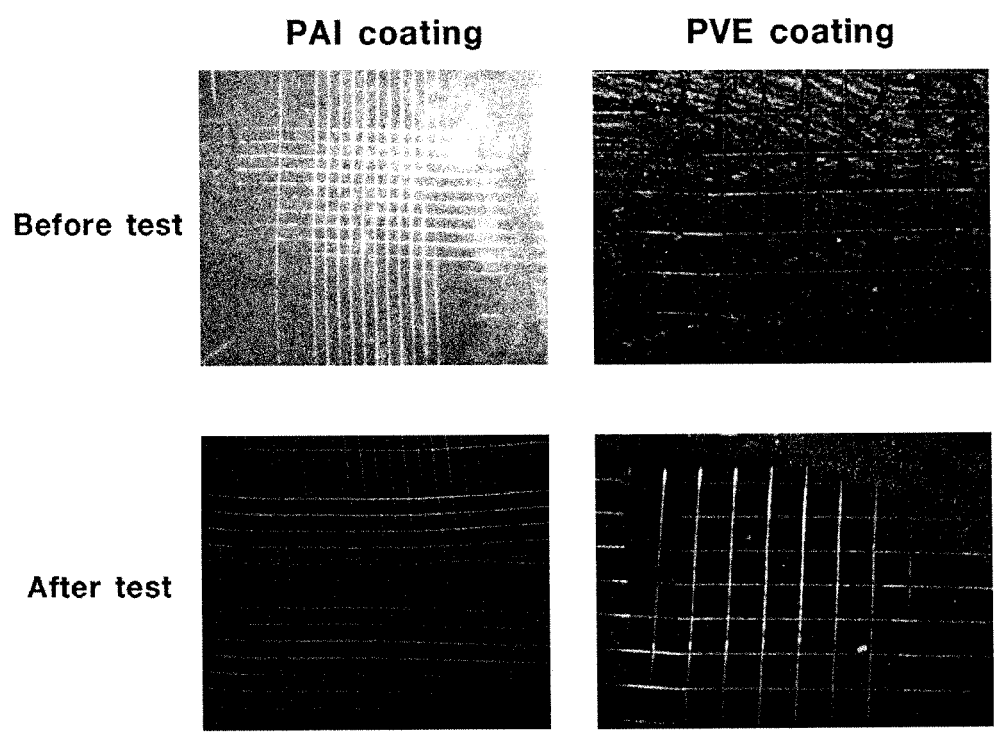
FIG. 7 shows the results of performing an adhesion test with respect to a second separator sample and a fourth separator sample.
Figure 8:
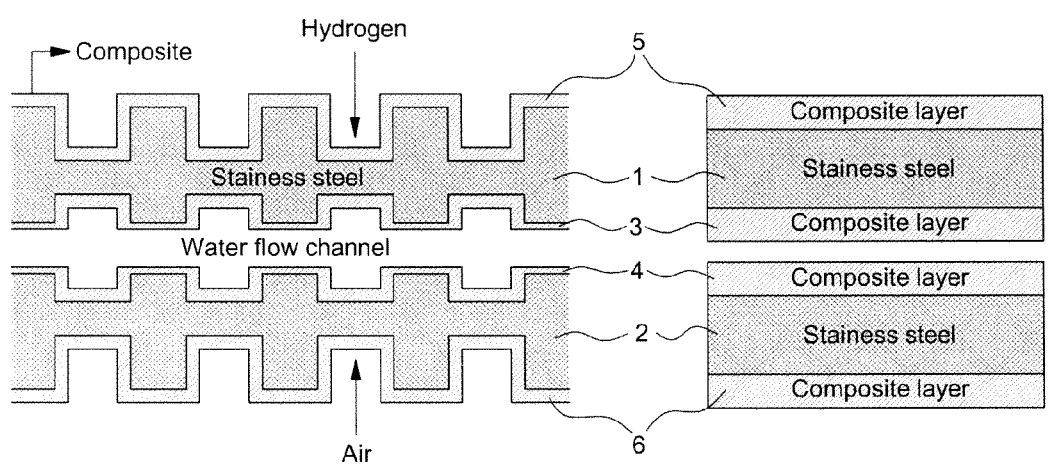
FIG. 8 is a schematic view showing a cross-sectional structure of a conventional separator for a fuel cell.

FIG. 7 illustrates the result of the adhesion test (ASTM D 3359) for the composite material layers on the second and fourth separator samples by the conductive filler type.

The fourth separator sample was prepared by applying the coating liquid containing PAI on the surface of a stainless steel substrate where carbon nanotubes were grown, and the second separator sample was prepared by applying the coating liquid containing PVE on the surface of a stainless steel substrate where nanotubes were grown.

As shown in FIG. 7, the fourth separator sample had excellent adhesion with the base materials because the coating layer on the surface thereof was not separated from the surface after attaching and detaching a tape. On the contrary, for the second separator, the coating layer was completely separated from the base materials together with the carbon nanotubes grown on the surface of the base materials. Accordingly, the PAI has better adhesion with the base materials than the PVE.

Moreover, the second separator sample using PVE had the lowest contact resistance value, but had very poor adhesion compared to the fourth separator sample using PAI.

As a result, PVE is not appropriate as the conductive filler of the composite material layer. On the other hand, PAI can provide competitive contact resistance based on excellent adhesion compared to other conductive polymers.

As described above, the formation of the single intermediate composite material layer between the upper metal plate and the lower metal plate can eliminate the contact surface between the upper metal plate and the lower metal plate, thus removing the contact resistance.

Moreover, the formation of the composite material layers on the carbon nanotubes grown on the upper metal plate and the lower metal plate can reduce the contact resistance generated between the respective metal plates and the composite material layers, minimizing the contact resistance generated between the upper metal plate and the lower metal plate, thus improving the efficiency of the fuel cell.

The present disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A separator for a fuel cell, the separator comprising:
an upper metal plate having opposing main sides including a first and a second composite material layer coated on both sides thereof, wherein carbon nanotubes are grown on both sides of the upper metal plate where the composite material layers are coated; and
a lower metal plate having opposing main sides stacked on a bottom of the upper metal plate and including a third and a fourth composite material layer coated on both sides thereof, wherein carbon nanotubes are grown on both sides of the lower metal plate where the composite material layers are coated,
wherein the second and third composite material layers between the upper metal plate and the lower metal plate are integrally bonded, before being solidified, to form a single intermediate composite material layer, and
the carbon nanotubes grown on the upper metal plate at the side of the second composite material layer and the carbon nanotubes grown on the lower metal plate at the side of the third composite material layer are directly connected to each other.

2. The separator of claim 1, wherein the carbon nanotubes are grown to a height of 5 to 10 μm.

3. The separator of claim 1, wherein the first, second, third, and fourth composite material layers are coated to a thickness of 10 to 20 μm.

4. A method for manufacturing a separator for a fuel cell, the method comprising steps of:
preparing an upper metal plate and a lower metal plate, each plate having opposing main sides;
growing carbon nanotubes on both sides of the upper metal plate and the lower metal plate, respectively;
after the growing carbon nanotubes, forming a first and a second composite material layer on both sides of the upper metal plate and a third and a fourth composite material layer on both sides of the lower metal plate by applying a coating liquid containing a polymer composite material on both sides of the upper and lower metal plates, respectively; and
forming a single intermediate composite material layer by stacking the upper metal plate on the lower metal plate, before drying the respective composite material layers, and integrally bonding the second composite material layer and the third composite material layer, such that the carbon nanotubes grown on the upper metal plate at the side of the second composite material layer and the carbon nanotubes grown on the lower metal plate at the side of the third composite material layer are directly connected to each other.

5. The method of claim 4 wherein the carbon nanotubes are grown to a height of 5 to 10 μm.

6. The method of claim 4, wherein the first, second, third, and fourth composite material layers are coated to a thickness of 10 to 20 μm.

7. The method of claim 4, wherein the coating liquid comprises polyamide-imide (PAI) as a conductive filler.

* * * * *